United States Patent
Takanashi

(10) Patent No.: US 6,719,102 B2
(45) Date of Patent: Apr. 13, 2004

(54) WEAR DETECTION PROBE FOR A BRAKING MEMBER

(75) Inventor: Hitoshi Takanashi, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/838,198

(22) Filed: Apr. 20, 2001

(65) Prior Publication Data

US 2001/0035316 A1 Nov. 1, 2001

(30) Foreign Application Priority Data

Apr. 21, 2000 (JP) ........................................ 2000-121373

(51) Int. Cl.[7] ........................... F16D 66/00; F16D 66/02
(52) U.S. Cl. ............................. 188/1.11 L; 188/1.11 W
(58) Field of Search ........................ 188/1.11 E, 1.11 L, 188/1.11 R, 1.11 W; 116/208; 340/454, 453; 192/30 W; 73/121, 129; 200/61.4

(56) References Cited

U.S. PATENT DOCUMENTS

| | | | |
|---|---|---|---|
| 3,675,197 A | * | 7/1972 | Bennett et al. .......... 188/1.11 L |
| 3,798,750 A | * | 3/1974 | Niedrach .................... 29/25.03 |
| 3,798,760 A | * | 3/1974 | Carlson et al. ................ 29/612 |
| 4,603,026 A | * | 7/1986 | Martin .................... 264/272.18 |
| 4,606,435 A | | 8/1986 | Johnson |
| 5,152,049 A | * | 10/1992 | McQueen ..................... 29/611 |
| 5,632,359 A | | 5/1997 | Camps et al. |
| 5,637,794 A | | 6/1997 | Hanisko |
| 5,692,585 A | | 12/1997 | Kazuro et al. .............. 188/1.11 |
| 5,833,033 A | | 11/1998 | Takanashi |
| 6,095,290 A | * | 8/2000 | Takanashi ................ 188/1.11 L |
| 6,105,422 A | | 8/2000 | Pollock et al. |
| 6,179,091 B1 | * | 1/2001 | Takanashi ................ 188/1.11 L |
| 6,290,027 B1 | * | 9/2001 | Matsuzaki .............. 188/1.11 L |
| 6,349,461 B2 | * | 2/2002 | Ishihara et al. .......... 29/407.08 |
| 6,543,102 B1 | * | 4/2003 | Zitzmann ...................... 338/25 |
| 2001/0035316 A1 | * | 11/2001 | Takanashi .............. 188/1.11 W |

FOREIGN PATENT DOCUMENTS

| | | | |
|---|---|---|---|
| DE | 198 25 300 A | | 12/1999 |
| EP | 0884497 | * | 12/1998 |
| EP | 0 974 767 A2 | | 1/2000 |
| FR | 2 260 724 A | | 9/1975 |
| GB | 1301538 | * | 12/1972 |
| JP | 1163054 | * | 3/1999 |
| JP | 11148524 | * | 6/1999 |
| JP | 11230217 | * | 8/1999 |
| JP | 110870 | * | 4/2000 |

* cited by examiner

Primary Examiner—Douglas C. Butler
(74) Attorney, Agent, or Firm—Oliff & Berridge, PLC

(57) ABSTRACT

A wear detection probe for detection of wear of a braking member is mounted in or adjacent to the braking member. The wear detection probe includes a holder having a detection wire in a wiring path. The detection wire has a folded portion, and two portions extending from the folded portion in a direction substantially parallel to the surface of the brake rotor. An apex of the folded portion of the detection wire is nearer than the straight portions to the wear surface of the holder, so that after a predetermined amount of wear, the folded portion is broken without breaking the straight portions. The probe is compact, and the wire remains securely in position during use.

7 Claims, 9 Drawing Sheets

WEAR DETECTION PROBE FOR A BRAKING MEMBER

BACKGROUND OF THE INVENTION

1. Field of Invention

The present invention relates to a wear detection probe for a braking member, particularly but not exclusively a braking member of a vehicle braking system, and further relates to a braking member having such a wear detection probe mounted thereon and to a brake including such a braking member.

2. Description of Related Art

A wear detection probe for detecting the degree of wear of a braking pad of a vehicle disclosed in U.S. Pat. No. 5,833,033 has an electrical detection wire folded in the shape of a "U" embedded in a holder made of resin. The wear detection probe is installed on a braking pad, with the apex at the folded portion of the wire exposed and opposed to a disk rotor and with two straight line portions of the wire extending from the folded portion parallel to the axis of the disk rotor. With the progress of the wear of the braking pad, the folded portion of the detection electric wire contacts the disk rotor and is abraded. When the wear of the braking pad reaches its use limit, the folded portion is broken, enabling an electrical signal to be derived.

In the wear detection probe, the two straight line portions of the wire extend to the rear side of the braking pad (opposite to the location of the disk rotor) and are connected to an external wire breakage detection circuit. Depending on the kind of vehicle, a sufficient space for electrical wiring is not available at the rear side of the braking pad.

Thus, a wear detection probe 1 as shown in FIGS. 9 and 10 has been proposed but is not thought to have been publicly used. This wear detection probe 1 is installed on a braking pad 4, with two straight line portions 2S$a$ and 2S$b$ of an electrical detection wire 2 parallel with a surface 3$a$ of a disk rotor 3 and with the one straight line portion 2S$a$ nearer to the disk rotor 3 than the other straight line portion 2S$b$. By arranging the straight line portions 2S in this manner, the wire 2 is extended out of the holder 4 in the radial direction of the disk rotor 3.

In the wear detection probe 1, with the progress of the wear of the braking pad 4, the straight line portion 2S$a$ nearer to the disk rotor 3 contacts the disk rotor 3 and is abraded thereby. When the wear of the braking pad 4 reaches the limit of use, as shown in FIG. 10, the straight line portion 2S$a$ nearer to the disk rotor 3 is broken, which event is detected by a wear detection circuit.

However, in the wear detection probe 1 having the two straight line portions 2S$a$ and 2S$b$ parallel with the surface 3$a$ of the disk rotor 3, when the radius of curvature of a folded portion 2R of the electric wire 2 is reduced, there is a risk that the electric wire 2 is broken at the folded portion 2R. Accordingly, to make the radius of curvature of the folded portion 2R comparatively large, it is necessary to space the two straight line portions 2S$a$ and 2S$b$ from each other at a large interval in a direction perpendicular to the surface 3$a$ of the disk rotor 3, which causes the wear detection probe 1 to be large.

To make the wear detection probe 1 more compact, it is conceivable to arrange the two straight line portions such that the distances between them and the surface of the disk rotor are equal, so that both straight line portions are subject to abrasion by the disk rotor. However, this construction causes the hole containing the wire to become open in the shape of a groove while the wear detection probe 1 is being abraded. As a result, there is a possibility that the wire becomes loose so that the desired manner of breaking of the wire is not achieved.

SUMMARY OF THE INVENTION

Accordingly, it is an object of the present invention to provide a wear detection probe which is compact in a direction perpendicular to the surface of a disk rotor, and which enables reliable wear detection.

According to the present invention, there is provided a wear detection probe for the detection of wear of a braking member, which in use is mounted on the braking member and includes a holder having a folded detection wire in a wiring path. The detection wire has a folded portion and two straight portions each extending from the folded portion in a direction substantially parallel to a wear surface of the holder which is worn away in use. The folded portion of the detection wire is located at a position nearer to the wear surface of the holder than the straight portions.

As in the probe of U.S. Pat. No. 5,833,033, the folded part of the detection wire in the probe of the invention is abraded by contact between the wire and the surface of the rotor and broken when the degree of wear of the braking member reaches a predetermined limit of use, thereby enabling an electrical signal indicating the wire breakage to be obtained.

According to the invention in a second aspect, there is provided a braking member that includes a body having an outer surface which is worn away in use and a wear detection probe mounted on the body. The wear detection probe having a holder has a wiring path therein. The probe also has a folded detection wire held in the wiring path and has a folded portion and two straight portions each extending from the folded portion in a direction substantially parallel to the outer surface of the braking member. The folded portion of the detection wire is located at a position nearer than the straight portions to the outer surface of the braking member.

According to the invention in a third aspect there is provided a brake that includes a rotor having a flat braking surface and a braking member that has a body having an outer surface parallel to the braking surface which in operation is brought into contact with the braking surface to effect braking of the rotor. The outer surface of the braking member is worn away in use. The braking member includes a wear detection probe mounted thereon. The wear detection probe includes a holder that has a wiring path therein. The probe has a folded detection wire held in the wiring path and has a folded portion and two straight portions each extending from the folded portion in a direction substantially parallel to the braking surface of the rotor. The folded portion of the detection wire is located at a position nearer than the straight portions to the braking surface of the rotor.

Preferably, the distance from one straight line portion to the surface of the rotor is equal to the distance from the other straight line portion to the surface of the rotor, i.e., the straight line portions lie in one plane. Preferably the two straight line portions are parallel to each other.

In the present invention, the two straight line portions are so disposed that the distance from the folded portion to the surface of the rotor is less than the distance from the straight line portions to the surface of the rotor. Thus, even though the spacing between the straight line portions is widened to increase the radius of curvature of the folded portion, the dimension of the path of the wire in the direction perpendicular to the surface of the rotor can be minimized, and may be equal to or slightly more than the outer diameter of the wire. Thus a minimal space is necessary for forming the region in which the two straight line portions are wired.

If both the two straight line portions were abraded by the rotor before the folded portion was broken, there is a fear that the detection wire may become loose. However, in the invention the folded portion to be broken is nearer than the two straight line portions to the rotor. Accordingly, the folded portion can be broken without abrading the two straight line portions. To break the detection wire without any abrasion of the two straight line portions, the apex of the folded portion is preferably located at a position nearer than the two straight line portions to the rotor by a distance greater than or equal to the outer diameter of the detection wire. In this case, in the direction perpendicular to the surface of the rotor, the dimension of the space required for the two straight line portions and the folded portion may be merely twice as large as the outer diameter of the detection wire.

BRIEF DESCRIPTION OF THE DRAWINGS

Embodiments of the invention will now be described by way of non-limitative example with reference to the accompanying drawings, in which.

DETAILED DESCRIPTION OF PREFERRED EMBODIMENTS

Figure 1:
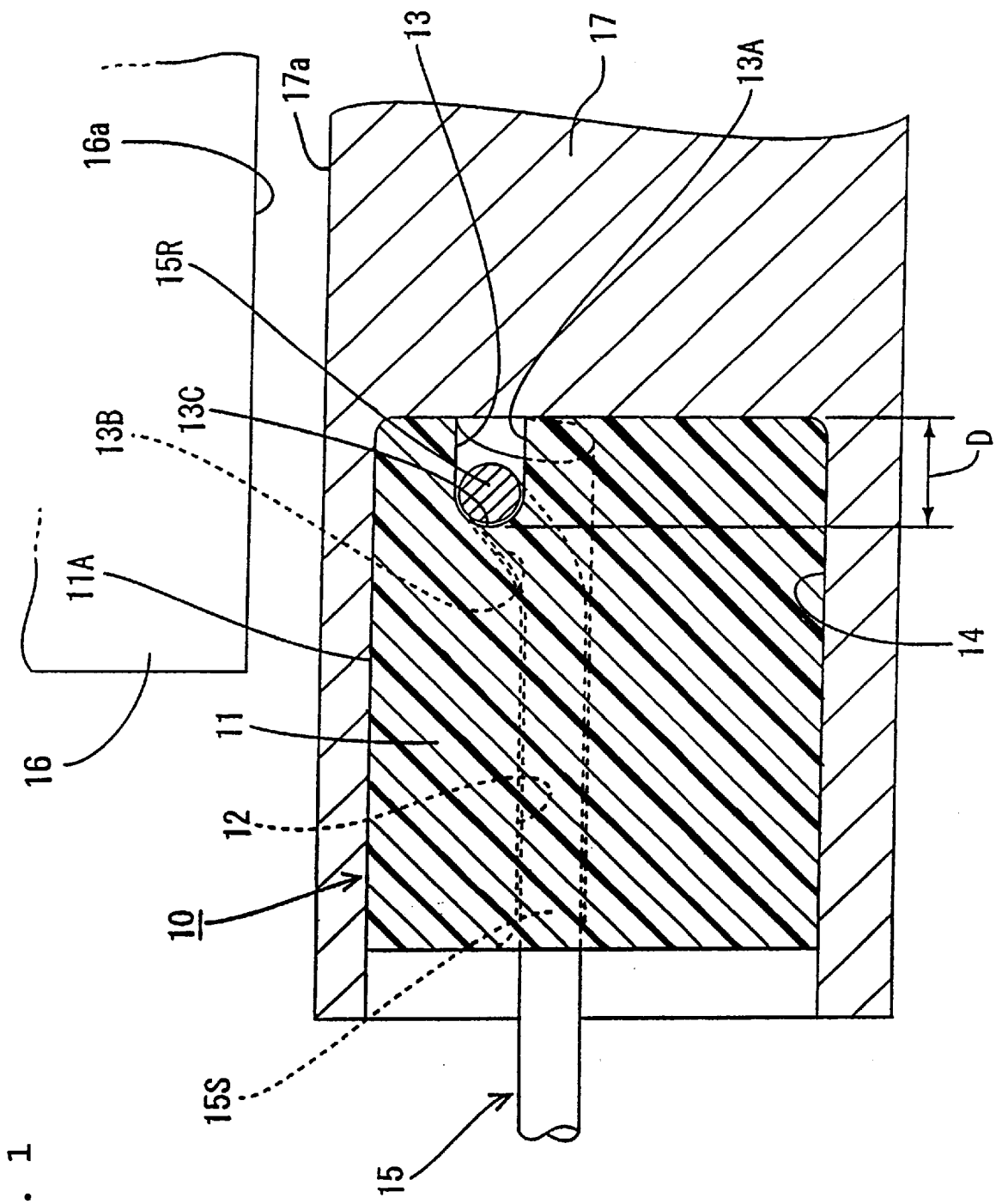
FIG. 1 is a sectional view of a wear detection probe embedded in a braking member according to a first embodiment of the present invention before an electrical detection wire is broken.
Figure 2:
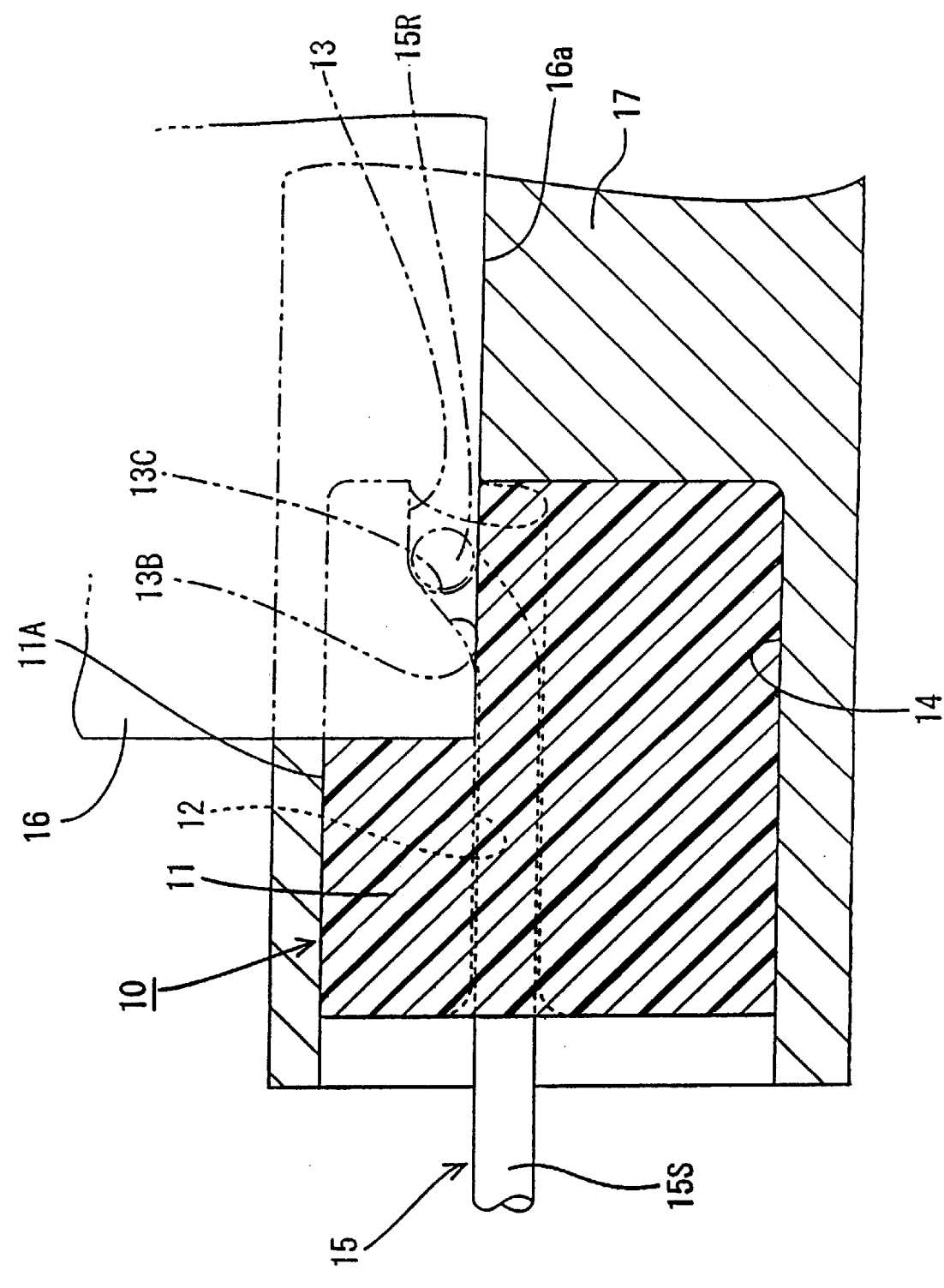
FIG. 2 is a sectional view of the wear detection probe shown in FIG. 1 in which the detection wire is broken.
Figure 3:
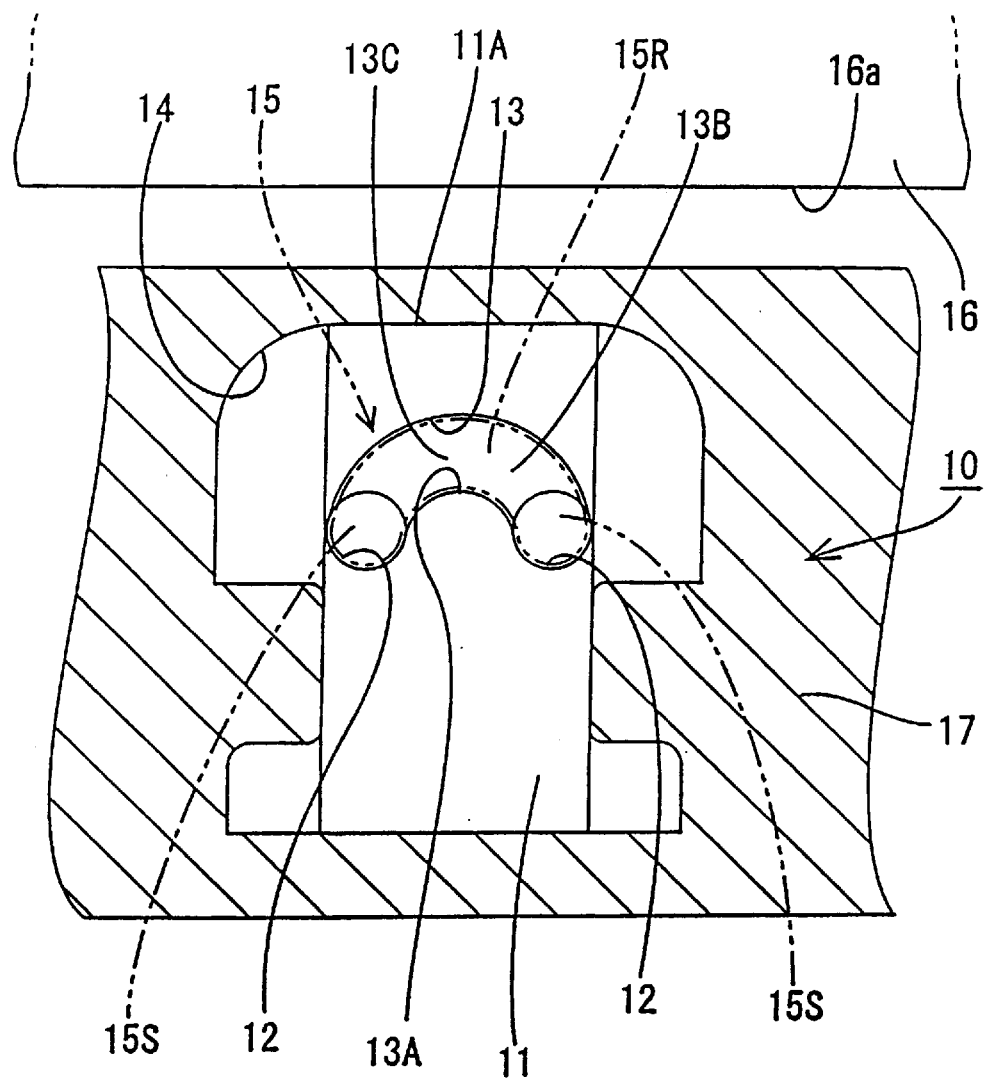
FIG. 3 is a front view of the wear detection probe shown in FIG. 1.

First, a disk brake system for a vehicle to which a wear detection probe 10 of the embodiment of FIGS. 1 to 6 is applied will be described. The disk brake system has a disk rotor 16 and a pair of braking members (only one of the pair is shown) in the form of pads 17 which in use are moved to sandwich the disk rotor 16 under load in its axial direction (vertical direction in FIG. 1) in a conventional manner to achieve braking effect on the rotor. An installing recess or hole 14 open in a direction (for example, outward in the radial direction of the disk rotor 16) parallel with the braking surface 16a of the disk rotor 16 (surface confronting the braking pad 17) is formed on one of the braking pads 17 to accommodate the wear detection probe 10 embodying the present invention.

The wear detection probe 10 has a holder 11 made of synthetic resin and one electrical detection wire 15 located in a wiring path which in this embodiment lies within the holder 11. In the description made below, the right side in FIGS. 1, 2, 5 and 6 is called the front side.

Figure 4:
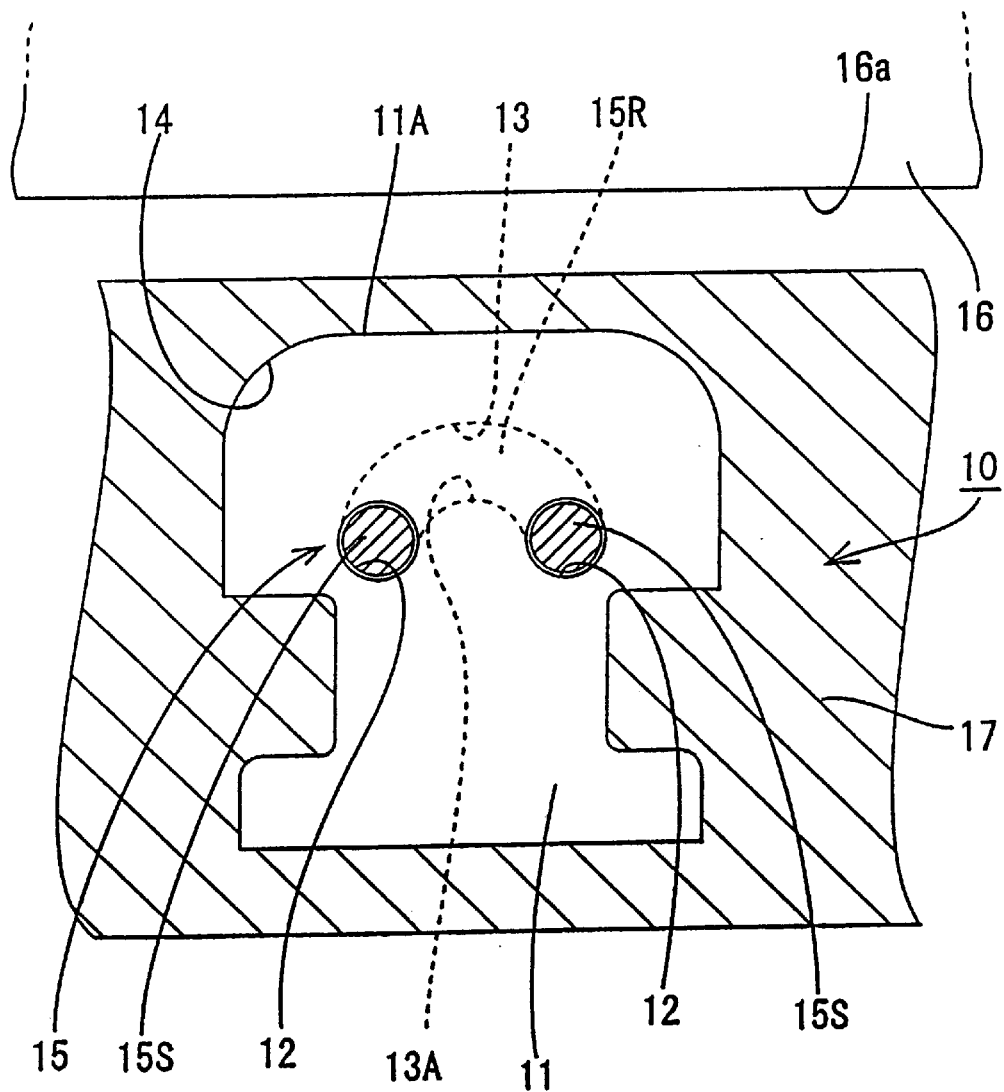
FIG. 4 is a rear view of the wear detection probe shown in FIG. 1.
Figure 5:
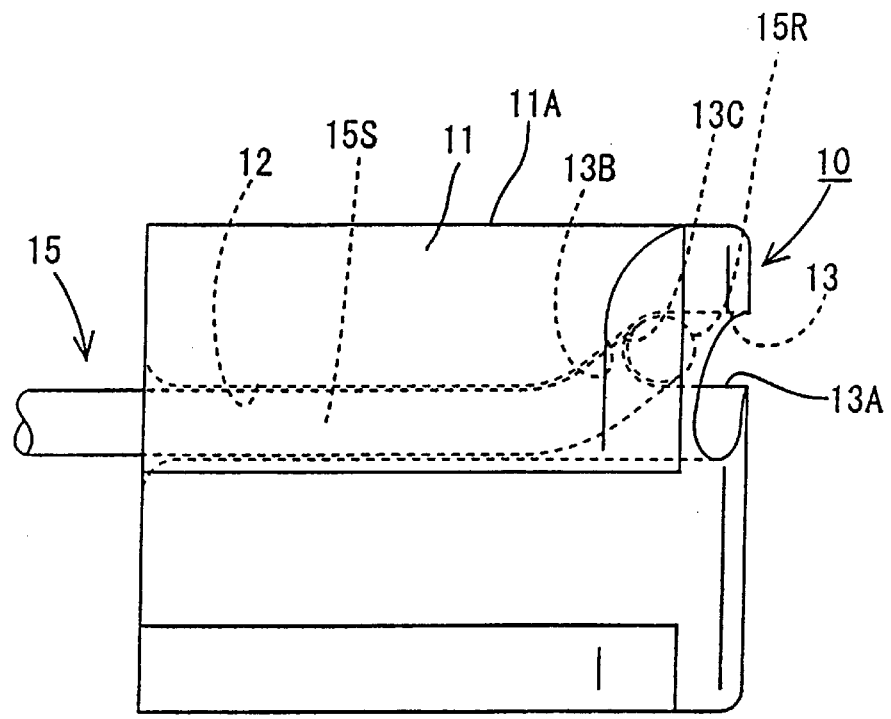
FIG. 5 is a left side view of the wear detection probe shown in FIG. 1.
Figure 6:
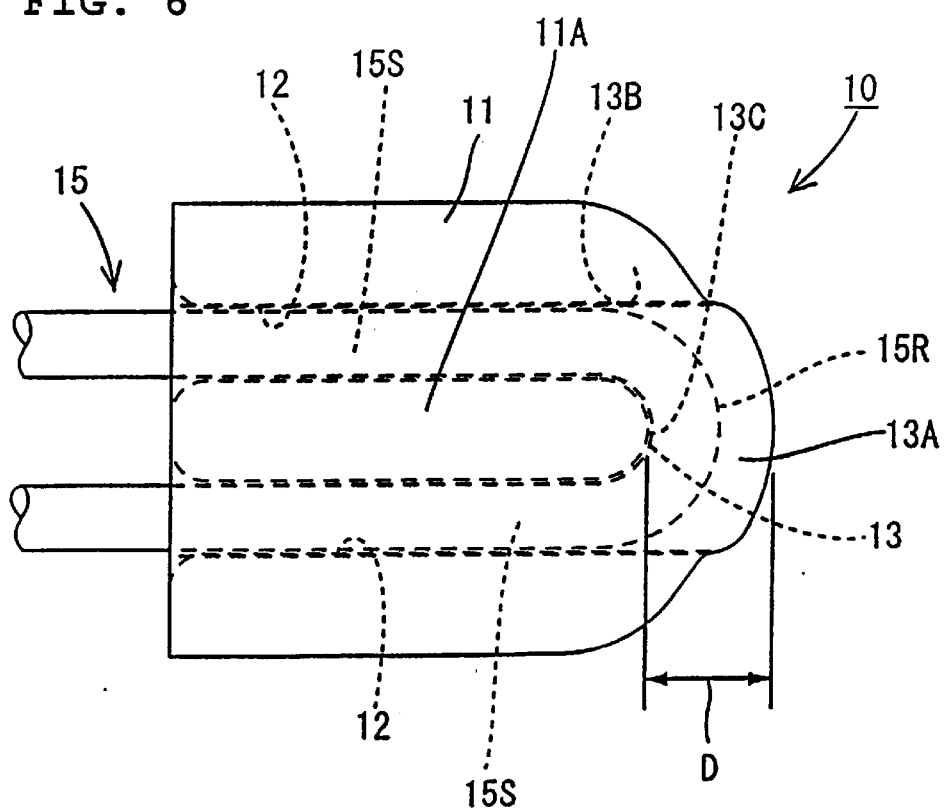
FIG. 6 is a plan view of the wear detection probe shown in FIG. 1.

As shown in FIG. 6, the holder 11 has a pair of parallel right and left straight wiring path portions 12 penetrating through it. As shown in FIG. 4, each straight wiring path portion 12 is circular in section. The inner diameter of each straight wiring path portion 12 is equal to or slightly larger than the outer diameter of the detection wire 15. The right and left straight wiring path portions 12 preferably have the same height position in the vertical direction relative to the upper surface of the holder 11.

The holder 11 has a folded wiring path portion 13 which may be open at its front side surface. The folded wiring path portion 13 is curved upward in front view, as shown in FIG. 1, and extends from one straight wiring path portion 12 to the other straight wiring path portion 12 semicircularly, as shown in FIG. 6. The width (difference between inner diameter and outer diameter) of the folded wiring path portion 13 is equal to the inner diameter of the straight wiring path portion 12. That is, the width of the folded wiring path portion 13 is equal to or slightly larger than the outer diameter of the detection wire 15. In the region from the apex 13A (part located at the center between the two straight wiring path portions 12 in the right-to-left direction) in the folded wiring path portion 13 to each straight wiring path portion 12, the rear end surface 13C of the folded wiring path portion 13 forms an inclined plane 13B descending downward toward the rear side in side view (see FIG. 1). When the folded wiring path portion 13 is viewed from above, the rear end surface 13C in the apex 13A is approximately semicircular. The length D of the apex 13A of the folded wiring path portion 13 in the front-to-back direction is set larger than the outer diameter of the detection wire 15.

The vertical positional relationship between the folded wiring path portion 13 and the straight wiring path portions 12 is preferably such that the lower end of the apex 13A is located on a level with the upper end of the straight wiring path portions 12.

An example of installing the detection wire 15 into the wiring path portions 12 and 13 is described as follows. With the detection wire 15 folded double, both ends thereof are inserted into the straight wiring path portions 12 from the front of the holder 11. The straight line portions 15S of the wire 15 are tightened inside the straight wiring path portions 12. With the folded portion 15R of the wire 15 accommodated in the folded wiring path portion 13, the folded portion 15R is brought into close contact with the rear end surface 13C of the folded wiring path portion 13 without loosening the folded portion 15R. The detection wire 15 wired in this manner is fixed to the holder 11 by suitable fixing means (not shown). The apex of the folded portion 15R of the detection wire 15 thus installed in the holder 11 is located at a position higher than the two straight line portions 15S by an amount equivalent to or slightly larger than the outer diameter of the detection wire 15.

When the wear detection probe 10 is mounted on the braking pad 17 in the hole 14 the upper surface 11A of the holder 11 faces the braking surface 16a of the disk rotor 16. At this time, the two straight line portions 15S of the detection electric wire 15 are parallel to the outer, wearing surface of the pad 17 and the surface 16a (surface which contacts with the braking pad 17) of the disk rotor 16. The distance from one straight line portion 15S to the surface 16a of the disk rotor 16 is preferably equal to the distance from the other straight line portion 15S to the surface 16*a* of the disk rotor 16, and the folded portion 15R is nearer than the two straight line portions 15S to the surface 16*a* of the disk rotor 16.

During braking of the rotating disk rotor 16, the braking pad 17 moves together with the wear detection probe 10 toward the disk rotor 16, with the surfaces of the braking pad 17 and the wear detection probe 10 facing the rotor 16 parallel with each other, and contacts the surface 16*a* of the disk rotor 16 with a high force. The surface of the braking pad 17 wears owing to the friction between the braking pad 17 and the surface 16*a* of the disk rotor 16. With the repetition of the braking operation, the wear of the braking pad 17 progresses. As a result, the upper side of the holder 11 is abraded by the contact with the surface 16*a* of the disk rotor 16. Further, the folded portion 15R of the detection wire 15 is abraded from the upper side thereof (upper side in FIGS. 1 and 2). When the degree of the wear of the braking pad 17 reaches the limit of use, the detection wire 15 is broken at the highest portion (apex) of the folded portion 15R. The breakage of the detection wire 15 is detected by a breakage detection circuit (not shown) connected with the detection wire 15.

The apex of the folded portion 15R which is broken is located at a position nearer than the straight line portion 15S to the disk rotor 16 by an amount equivalent to or slightly larger than the outer diameter of the detection wire 15. Therefore, the surface 16*a* of the disk rotor 16 does not reach the straight line portions 15S before the folded portion 15R is broken.

As described above, in the embodiment, the distance from one straight line portion 15S to the surface 16*a* of the disk rotor 16 may be equal to the distance from the other straight line portion 15S to the surface 16*a* of the disk rotor 16. Thus, even if the spacing between both straight line portions 15S in the right-to-left direction is widened by increasing the radius of curvature of the folded portion 15R, only a distance equal to the outer diameter of the detection wire 15 in the direction perpendicular to the surface 16*a* of the disk rotor 16 is necessary for forming the space in which the two straight line portions 15S are wired. Accordingly, it is possible to make the wear detection probe 10 compact in the direction perpendicular to the surface 16*a* of the disk rotor 16.

If both the two straight line portions 15S were abraded by the disk rotor 16 before the folded portion 15R was broken, the straight wiring path portion 12 and the folded wiring path 13 would be open in the shape of a groove at the upward side thereof. In this case, there is a fear that the detection electric wire 15 would become loose. However, in the embodiment, the folded portion 15R to be broken is nearer than the two straight line portions 15S to the disk rotor 16. Accordingly, the folded portion 15R can be broken without abrading the two straight line portions 15S.

To ensure the breaking of the folded portion 15R without abrading the two straight line portions 15S, the apex of the folded portion 15R is spaced at a minimum interval from the two straight line portions 15S. That is, the folded portion 15R is located at a position nearer than the two straight line portions 15S to the disk rotor 16 by an amount equivalent to or slightly more than the outer diameter of the detection electric wire 15. Therefore, in the direction (height direction of the wear detection probe 10) perpendicular to the surface 16*a* of the disk rotor 16, the dimension of the space for wiring the two straight line portions 15S and the folded portion 15R can be just twice as large as the outer diameter of the detection wire 15. In this respect, it is possible to make the wear detection probe 10 compact in the direction perpendicular to the surface 16*a* of the disk rotor 16.

Figure 7:
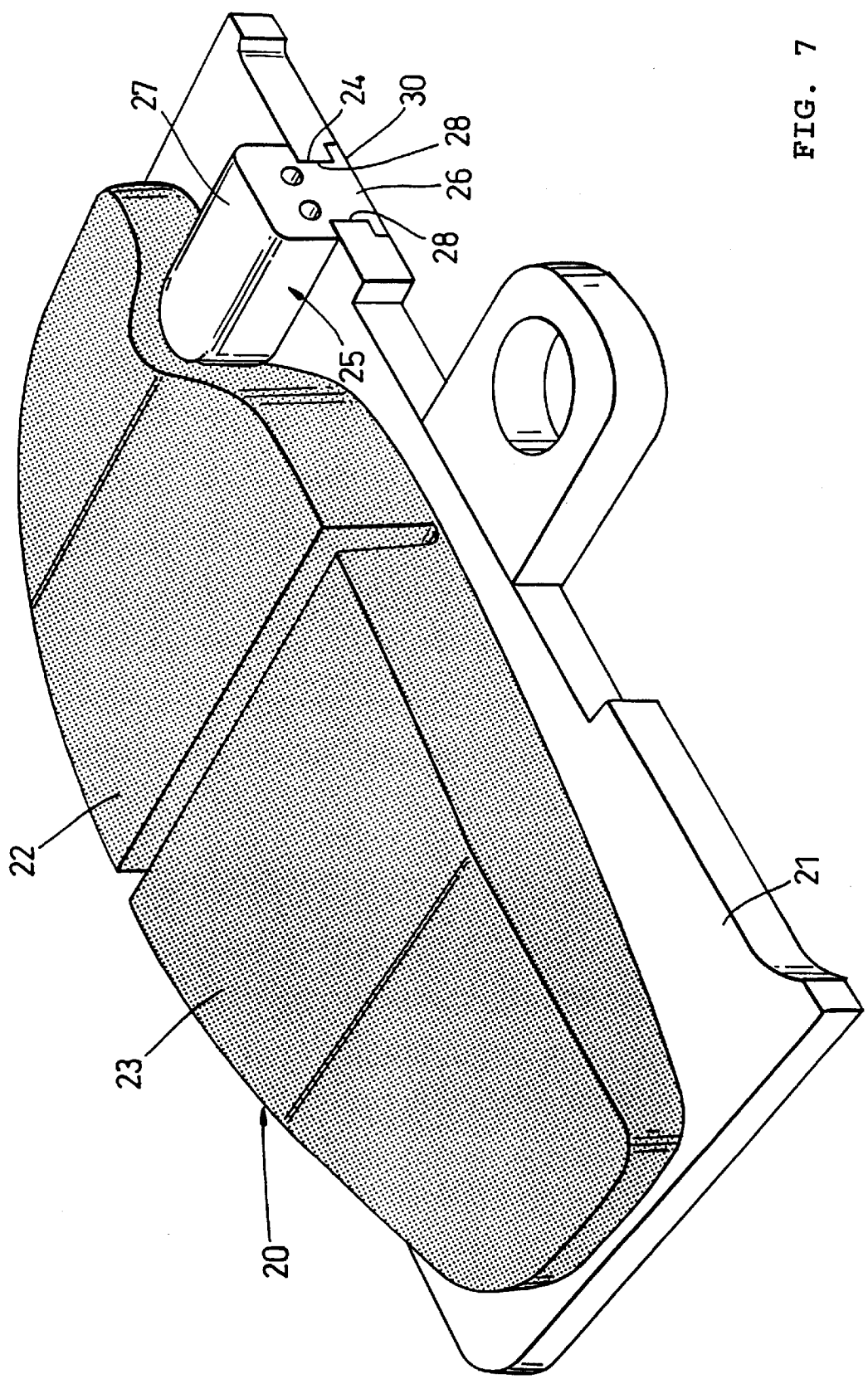
FIG. 7 is a perspective view of a braking member of another embodiment of the invention.
Figure 8:
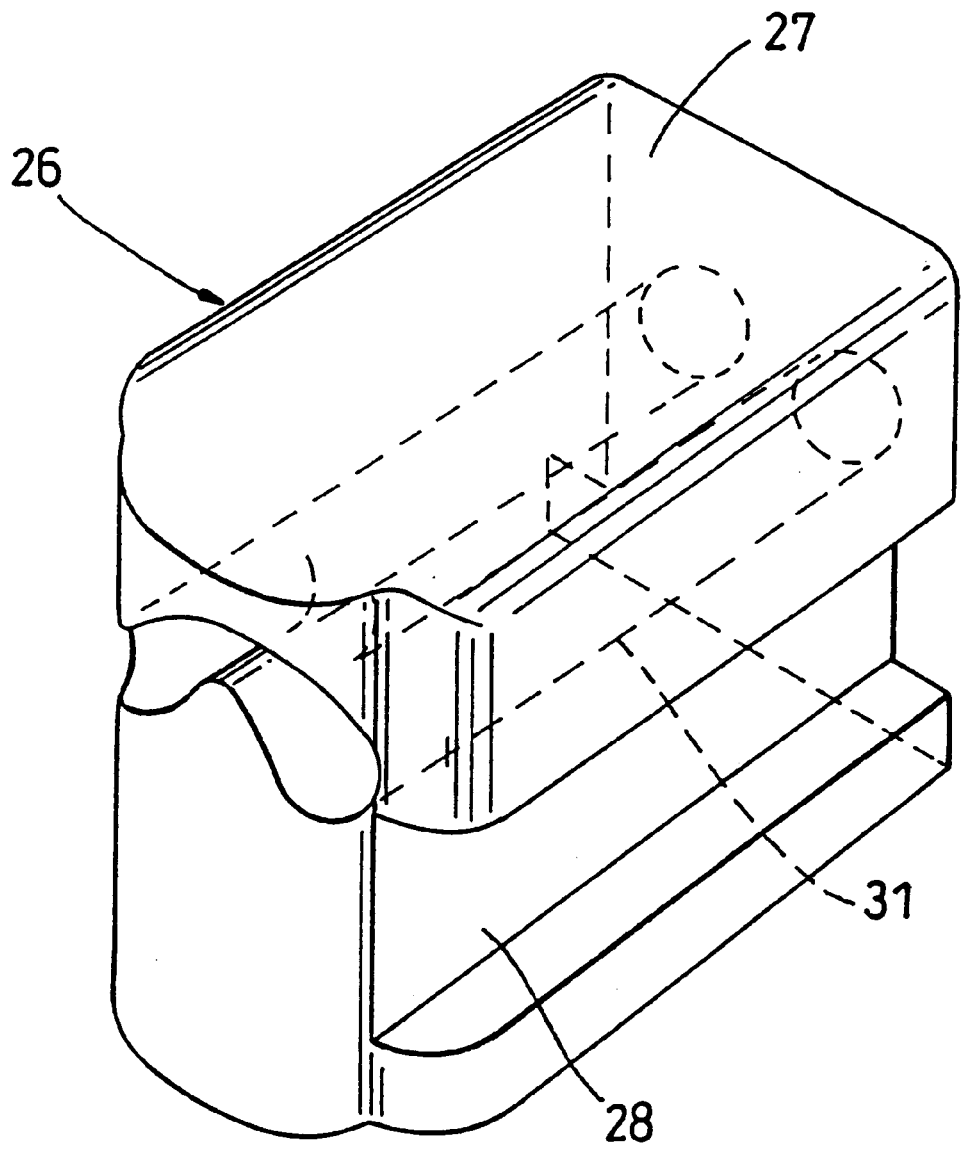
FIG. 8 is a perspective view of the wear detection probe of the braking member of FIG. 7.
Figure 9:
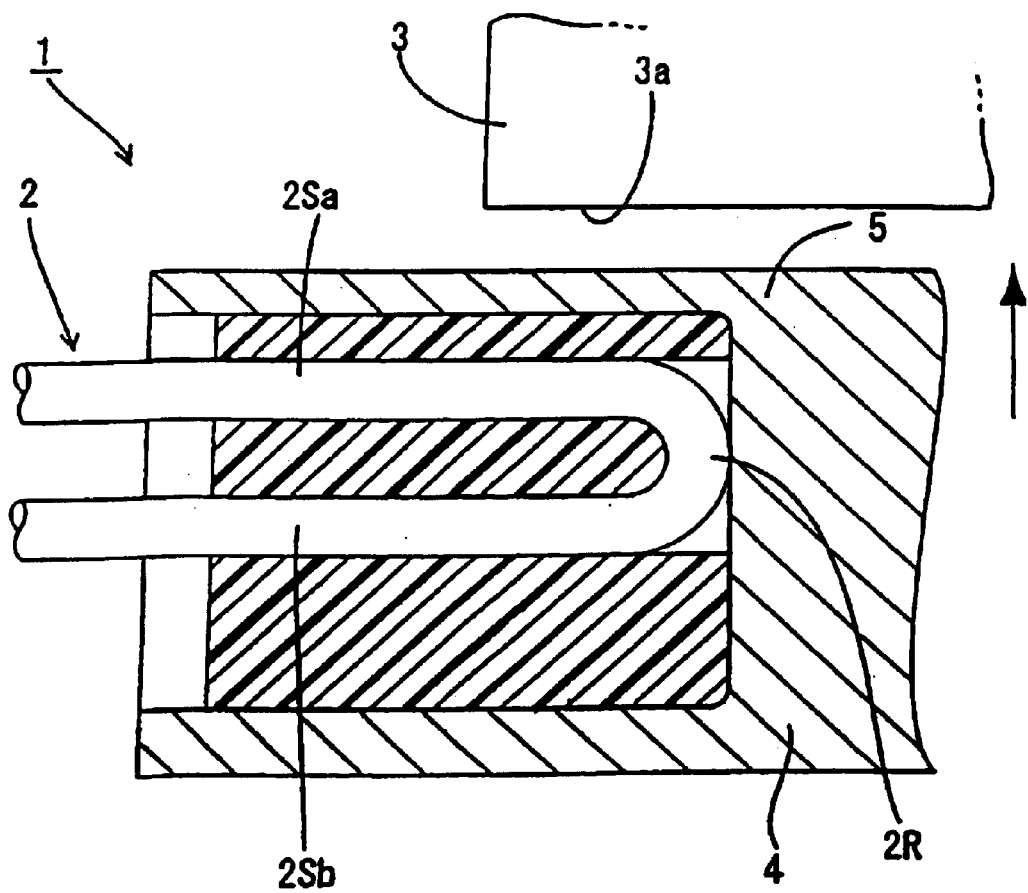
FIG. 9 is a sectional view of a state before a detection electric wire is broken in a probe of a comparative example.
Figure 10:
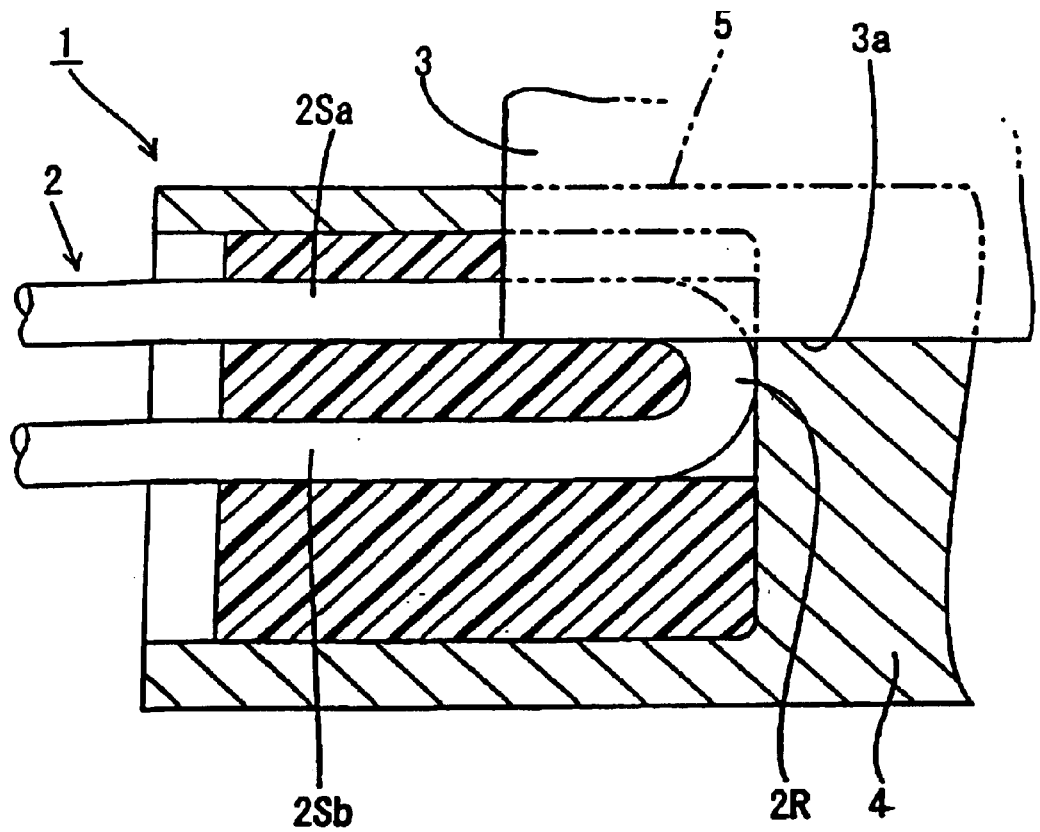
FIG. 10 is a sectional view of the probe of FIG. 9 showing a state in which a detection electric wire is broken.

FIGS. 7 and 8 show a second embodiment of the invention, more particularly a disk brake braking member 20 having a flat metal plate 21 and a brake pad 22 fixed on the metal plate 21 by, for example, an adhesive or other suitable fastener such as rivets. In use the braking member 20 is mounted in the disk brake with the top surface 23 of the pad 22 parallel to the braking face of the disk rotor (not shown). The metal plate 21 may have a stepped slot 24 adjacent a recess in one side of the pad 22. A wire holder 26 of a wear detection probe 25 is attached to the metal plate 21, preferably by being received in the slot 24, as shown. Alternatively, the holder 26 may be attached to the metal plate 21 by adhesive, rivets or the like. The top surface 27 of the wire holder 26 is preferably parallel to the top surface 23 of the pad 22. When the holder 26 is to be attached by being received in the slot 24, the holder 26 has grooves 28 in its sides so that it slides onto the edges of the narrower portion of the slot 24. The base 30 of the holder 26 is flush with the base of the plate 21.

The holder 26 contains a wiring path 31 of the same shape as the wiring path portions 13A–13C of the embodiment of FIGS. 1 to 6, with an electrical detection wire (not shown in FIGS. 7 and 8) lying in the wiring path in the manner shown in FIGS. 1 to 6. Although in this embodiment the holder 26 is alongside the wear surface 23 of the pad, rather than embedded in the pad as in FIGS. 1 to 6, the method of operation is the same.

The scope of the present invention is not limited to the above-described embodiments, but the following modified embodiments are for example included. In addition to the following embodiments, the present invention can be embodied in various modes without departing from the gist of the present invention.

(1) In the above-described embodiments, the folded portion is located at a position nearer than the straight line portions to the disk rotor by an amount equal to or slightly larger than the outer diameter of the detection wire. But also within the scope of the present invention, the folded portion may be located at a position nearer than the straight line portion to the disk rotor by any distance greater than the outer diameter of the detection wire.

(2) In the above-described embodiments, the wear detection probe is installed on the braking pad, with the straight line portions of the wire 15 parallel to the radial direction of the disk rotor. But within the present invention, the wear detection probe may be installed on the braking pad, with the straight line portion parallel to the surface of the disk rotor and oblique or perpendicular to the radial direction thereof.

(3) In the above-described embodiments, the wear detection probe is used for a disk brake for a vehicle. But within the present invention, the wear detection probe may be used for a drum brake, a friction brake, and the like in vehicles and in machinery other than vehicles.

(4) In the above-described embodiments, the two straight line portions extend parallel to each other in the holder. But according to the present invention, they may extend obliquely to each other in a plane parallel to the surface of the disk rotor.

(5) In the above-described embodiments, the front end of the wiring path is open and the detection wire is folded double and inserted into straight wiring path portions 12 from the front of the holder 11. However, it is also possible to imbed the detection wire 15 in the holder 11 by insert molding. In other words, the detection wire 15 may be placed in a mold and the material of the holder 11 may be inserted into the mold in liquid form, thus surrounding and solidifying around the detection wire 15. In this case, the front end of the wiring path need not be open. Other situations in which the front end of the wiring path need not be open include situations in which the wiring path is large enough in diameter and/or the detection wire 15 is flexible enough that the detection wire 15 can be threaded through one straight wiring path portion 12, around the folded wire path portion 13, and back through the other straight wiring path portion 12. Another situation in which the front end of the wiring path need not be open is a situation in which the holder 11 is formed of two mating portions, each including grooves corresponding to the straight wiring path portions 12 and the folded wiring path portion 13 such that, when the medium portions of the holder 11 are attached together, the complete wiring path is formed.

(6) In the above-described embodiments, the detection wire 15 includes portions and a curved portion. However, it is also possible within the scope of the present invention to provide a detection wire with only one straight portion, or with no straight portions. For example, particularly if the protection wire 15 is inserted molded into the holder 11, one or more of the segments of one or more of the portions 15S of the detection wire 15 may be curved, preferably within a plane parallel to the surface of the rotor.

What is claimed is:

1. A wear detection probe, comprising:
   a holder having a wear surface which is worn away in use and a wiring path within the holder; and
   a folded detection wire held in said wiring path, said folded detection wire having a folded first portion and two second portions each extending from said folded first portion in a direction substantially parallel to said wear surface, said folded first portion of said detection wire being located at a position nearer than said second portions to said wear surface,
   wherein said two second portions of said detection wire are so disposed that a distance from one said second portion to said wear surface of the holder is equal to a distance from the other said second portion to said wear surface of the holder; and
   wherein the holder has an opening, on a side adjacent to the folded first portion, leading from the wiring path to outside the holder.

2. A wear detection probe according to claim 1, wherein said two second portions of said detection wire are parallel to each other.

3. A wear detection probe according to claim 1, wherein said folded first portion of said detection wire has an apex located at a position nearer than said second portions to said wear surface of the holder.

4. A wear detection probe according to claim 3, wherein said apex is nearer to said wear surface of the holder by an amount equal to or greater than an outer diameter of the detection wire.

5. A braking member, comprising:
   a body having an outer surface which is worn away in use; and
   a wear detection probe mounted in said body, said wear detection probe comprising:
      a holder having a wiring path therein; and
      a folded detection wire held in said wiring path, said folded detection wire having a folded first portion and two second portions each extending from said folded first portion in a direction substantially parallel to said outer surface of said body, said folded first portion of said detection wire being located at a position nearer than said second portions to said outer surface of said braking member,
   wherein said two second portions of said detection wire are so disposed that a distance from one said second portion to said outer surface of the body is equal to a distance from the other said second portion to said outer surface of the body; and
   wherein the holder has an opening, on a side adjacent to the folded first portion, leading from the wiring path to outside the holder.

6. A brake, comprising:
   a rotor having a braking surface; and
   a braking member, said braking member comprising:
      a body having an outer surface parallel to said braking surface which in use is brought into contact with said braking surface to effect braking of said rotor, said outer surface of said braking member being worn away in use; and
      a wear detection probe mounted in said body, said wear detection probe comprising:
         a holder having a wiring path therein; and
         a folded detection wire held in said wiring path, said folded detection wire having a folded first portion and two second portions each extending from said folded first portion in a direction substantially parallel to said braking surface of said rotor, said folded portion of said detection wire being located at a position nearer than said second portions to said braking surface of said rotor,
   wherein said two second portions of said detection wire are so disposed that a distance from one said second portion to said outer surface of the body is equal to a distance from the other said second portion to said outer surface of the body; and
   wherein the holder has an opening, on a side adjacent to the folded first portion, leading from the wiring path to outside the holder.

7. A brake, comprising:
   a brake rotor having a contact surface;
   a braking member adjacent to said brake rotor, said braking member being adapted in operation to come into contact with said contact surface, thereby causing wear of said braking member; and
   a wear detection probe mounted on said braking member so as to be worn away when said braking member is worn, said wear detection probe comprising:
      a holder having a wiring path therein; and
      a folded detection wire located in said wiring path, said detection wire having a folded first portion and two second portions, said second portions extending from said folded first portion in a direction substantially parallel to said contact surface of said brake rotor, and said folded first portion having an apex, said apex being at a position nearer than said second portions to said contact surface of said brake rotor whereby, when said braking member is worn to a use limit, said detection wire is broken at said apex of said folded first portion and becomes discontinuous, thereby indicating a predetermined amount of wear of said braking member,
   wherein said two second portions of said detection wire are so disposed that a distance from one said second portion to said contact surface of the brake rotor is equal to a distance from the other said second portion to said contact surface of the brake rotor; and
   wherein the holder has an opening, on a side adjacent to the folded first portion, leading from the wiring path to outside the holder.

* * * * *